United States Patent

Uematsu et al.

[11] Patent Number: 5,951,246
[45] Date of Patent: Sep. 14, 1999

[54] EXHAUST SYSTEM FOR MARINE GAS TURBINE

[75] Inventors: Kazuo Uematsu; Hidetaka Mori, both of Takasago, Japan

[73] Assignee: Mitsubishi Heavy Industries, Ltd., Tokyo, Japan

[21] Appl. No.: 08/834,277

[22] Filed: Apr. 15, 1997

[51] Int. Cl.$^6$ .................................................. F01D 1/02
[52] U.S. Cl. .................................. 415/208.1; 415/211.2; 415/212.1; 415/220; 415/221; 415/226; 60/271; 239/265.19
[58] Field of Search .................. 415/208.1, 226, 415/211.2, 212.1, 220, 221; 416/93 A, 93 R, 244 B, 245 A; 60/39.04, 271; 239/265.19

[56] References Cited

FOREIGN PATENT DOCUMENTS 63-63541  4/1988  Japan .

Primary Examiner—Edward K. Look
Assistant Examiner—Ninh Nguyen

[57] ABSTRACT

An exhaust system for a marine gas turbine may suppress a reduction of an efficiency even if a space therefor is small. In the exhaust system for a marine gas turbine, in which an end portion of an exhaust diffuser 2 is assembled into an exhaust chamber 1 connected with an upper exhaust eductor 4, the end portion of the exhaust diffuser 2 is disposed in the vicinity of an inlet of the exhaust chamber 1. An outlet 2a of the exhaust diffuser is slanted so that an upper portion of the outlet of an end of the exhaust diffuser is located upstream of a lower portion of the outlet. As a result, the exhaust gas may readily flow around and into the exhaust eductor 4.

10 Claims, 3 Drawing Sheets

EXHAUST SYSTEM FOR MARINE GAS TURBINE

BACKGROUND OF THE INVENTION

The present invention relates to an exhaust system for a marine gas turbine which may enhance the performance of an exhaust diffuser.

In general, it is possible to enhance the efficiency by enlarging the exhaust chamber of a gas turbine and also elongating the diffuser disposed in the exhaust chamber. However, since an exhaust chamber assembly of a marine gas turbine has to be incorporated into an engine space of a ship, in some cases, it is impossible to enlarge the exhaust chamber assembly. In such cases, the diffuser performance must be sacrificed in order to shorten its length, and an optimum shape thereof is sought therefor.

FIG. 3 is a schematic view showing a conventional exhaust system for a marine gas turbine. This type of exhaust system is most frequently designed and used, and called a "Long diffuser" type. In this exhaust system for a conventional marine gas turbine, an end portion of an exhaust diffuser 2, having a circular cross-section and arranged substantially horizontally, is inserted into a central portion of an exhaust chamber 1. An outlet of the end of the exhaust diffuser 2 is cut vertically. A boss 3 having a circular cross-section and provided with heat-insulating and sound-absorbing material is assembled coaxially in the interior of the exhaust diffuser 2.

The exhaust gas of the marine gas turbine flows in the interior of the doughnut-shaped and substantially horizontally arranged exhaust diffuser 2 while decreasing its velocity. The exhaust gas is diffused in the exhaust chamber 1 and is introduced into an exhaust eductor 4 connected to an upper portion of the exhaust chamber as indicated by an arrow.

In the case in which the space where the conventional exhaust system of the marine gas turbine is installed is limited, the exhaust chamber becomes small in size, and the length of the exhaust diffuser becomes short. Accordingly, a pressure restoring coefficient (which is represented by a pressure loss coefficient Cp; the higher the value, the greater the diffuser performance) which represents the performance of the exhaust diffuser is low. The efficiency becomes worse.

SUMMARY OF THE INVENTION

An object of the present invention is to overcome the above-noted defects.

According to the present invention, an exhaust system for a marine gas turbine, in which an end portion of an exhaust diffuser is assembled into an exhaust chamber connected with an upper exhaust eductor, is characterized in that the end portion of the exhaust diffuser is disposed in the vicinity of an inlet of the exhaust chamber and an outlet of an end of the exhaust diffuser is slanted so that an upper portion of the outlet of an end of the exhaust diffuser is located upstream of a lower portion of the outlet.

Further, according to the present invention, an exhaust system for a marine gas turbine mentioned above is characterized in that the exhaust diffuser is arranged horizontally.

According to the present invention, the exhaust diffuser is shortened in length in comparison with the conventional diffuser, the end portion thereof is arranged in the vicinity of an inlet of the exhaust chamber, and an outlet at the end of the exhaust diffuser is slanted so that an upper portion of the outlet at the end of the exhaust diffuser is located rearwardly (on the upstream side of the flow of the exhaust gas). The exhaust gas is thus allowed to easily flow around upper portion, thereby considerably enhancing the value of the static pressure restoring coefficient Cp of the diffuser.

For example, in the case of a conventional diffuser (long diffuser) as shown in FIG. 3, test results of the static pressure restoring coefficient Cp from the inlet of the diffuser to the inlet of the exhaust eductor show CP=0.18 to 0.12. However, according to the present invention, test results show CP=0.47 to 0.38. As shown in the results, the difference in the efficiency is remarkable.

DESCRIPTION OF THE PREFERRED EMBODIMENTS

Figure 1:
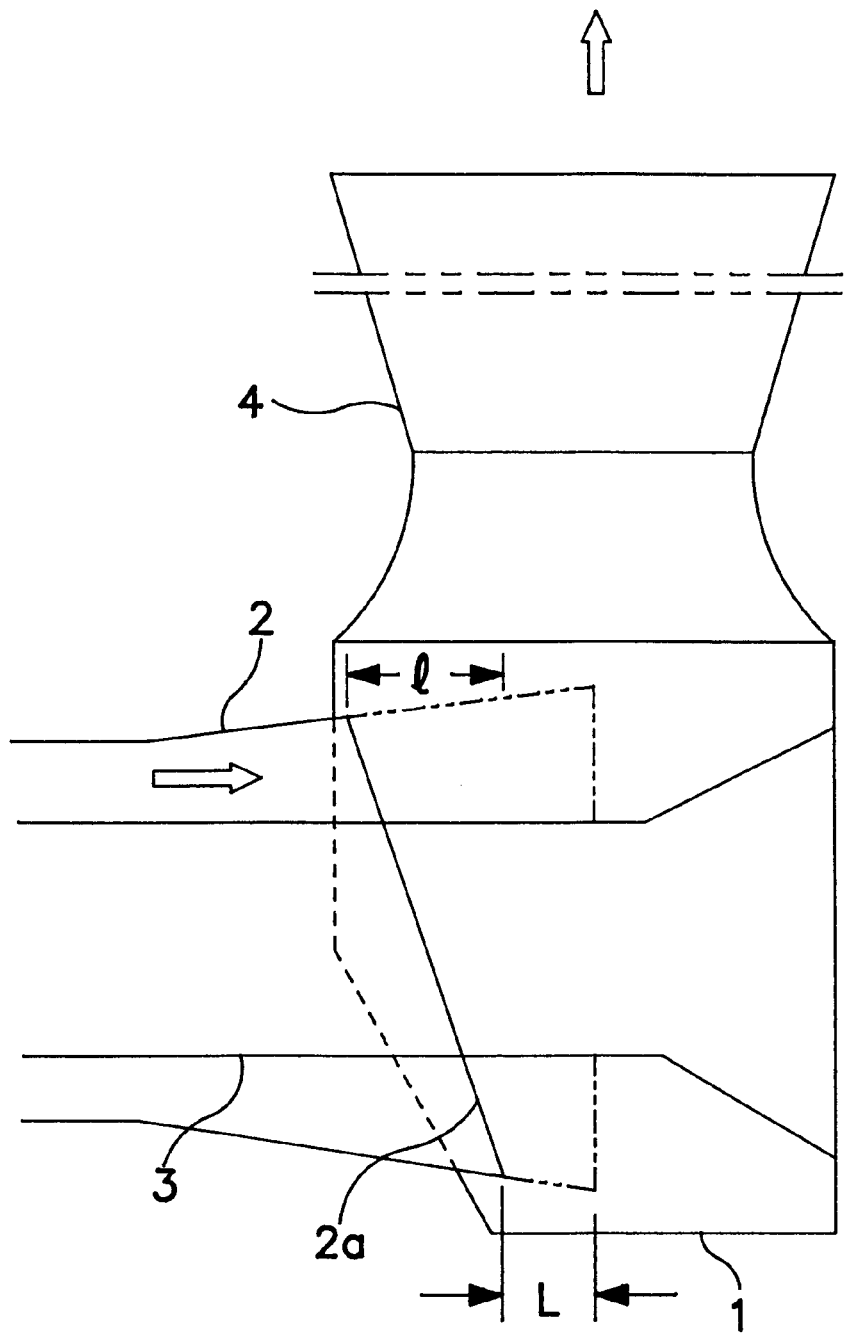
FIG. 1 is a schematic view showing an exhaust system for a marine gas turbine in accordance with a preferred embodiment of the invention.
Figure 2:
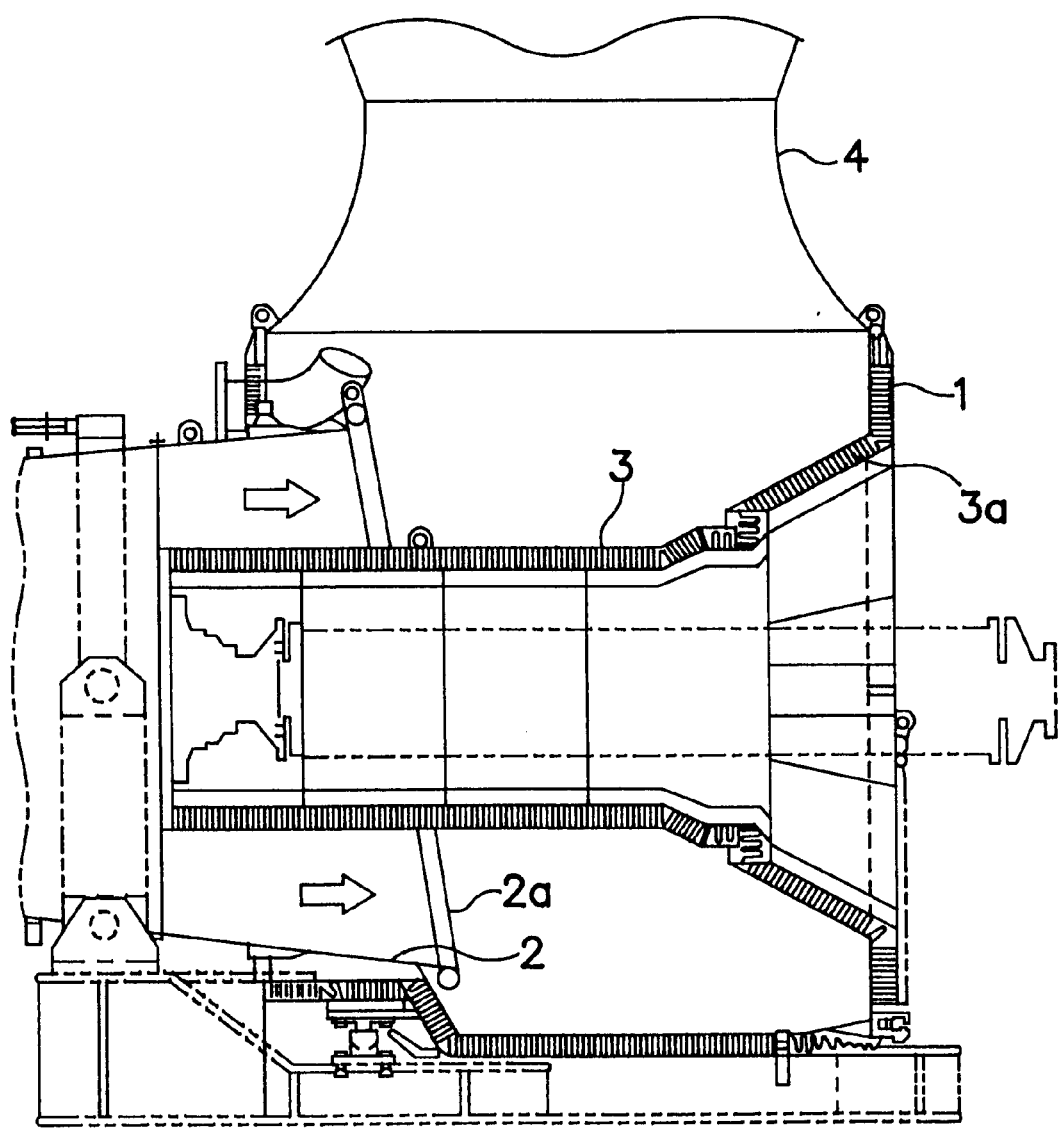
FIG. 2 is a cross-sectional view showing the exhaust system.

The present invention will now be described with reference to the accompanying drawings. A preferred embodiment of the invention will be described with reference to FIGS. 1 and 2. FIG. 1 is a schematic view showing an exhaust system for a marine gas turbine in accordance with the preferred embodiment of the invention. FIG. 2 is a cross-sectional view showing the exhaust system.

Figure 3:
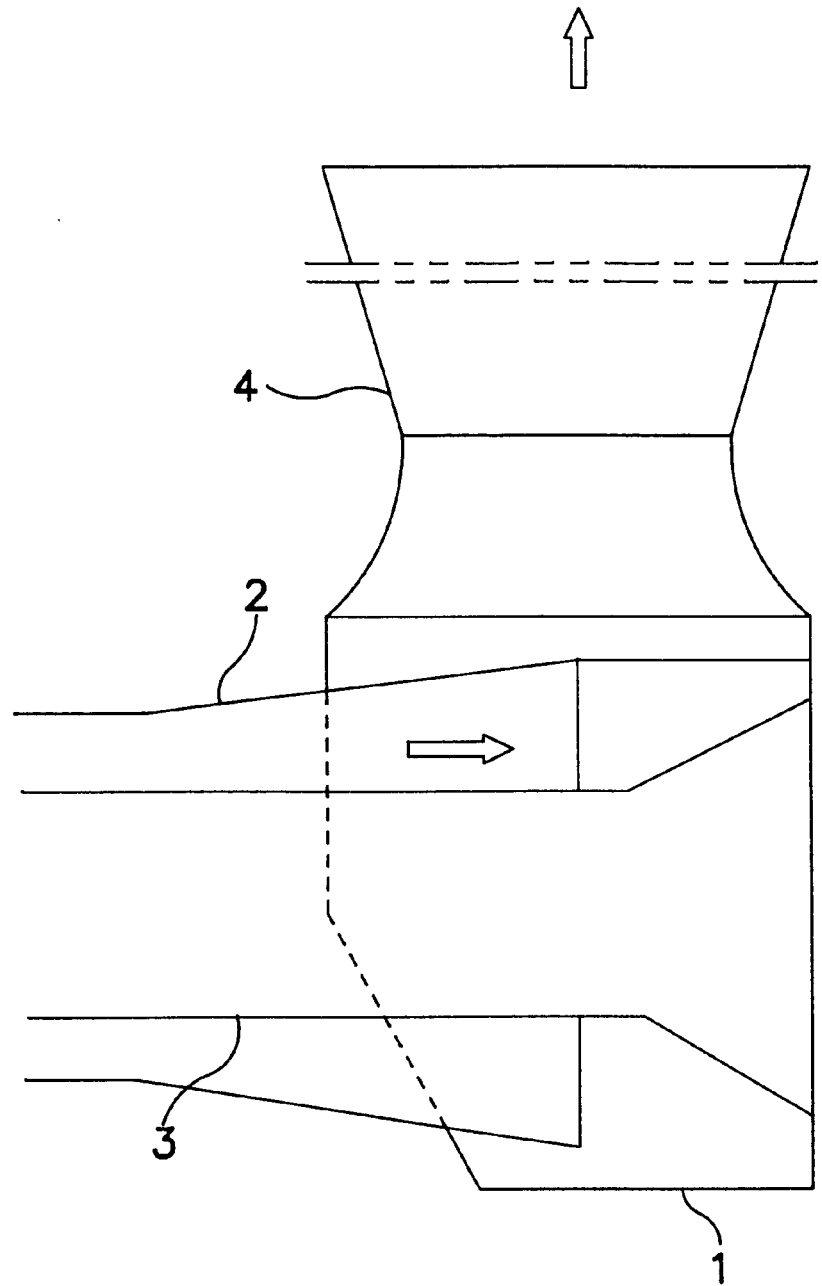
FIG. 3 is a schematic view showing a conventional exhaust system for a marine gas turbine.

The exhaust system in accordance with the preferred embodiment of the invention relates to an improvement to the exhaust system for a marine gas turbine shown in FIG. 3. In FIGS. 1 and 2, the same reference numerals are used to indicate the like members and components in FIG. 3. Duplication of the explanation thereof will be omitted.

In accordance with the preferred embodiment, the exhaust diffuser 2 of the exhaust chamber 1 is shortened in length by L in comparison with the conventional long diffuser indicated by a two-dot-and-dash line in FIG. 1. The end portion of the exhaust diffuser 2 is arranged in the vicinity of an inlet of the exhaust chamber 1. In order to cause the exhaust gas to easily flow around and into the upper eductor 4, an outlet 2a at the end of the exhaust diffuser 2 is obliquely cut so that an upper portion of the outlet 2a at the end of the exhaust diffuser 2 is located rearwardly (on the upstream side of the flow of the exhaust gas) by a length 1 from the lower portion thereof. This shape may be called a short and upper portion cut diffuser. Incidentally, reference character 3a in FIG. 2 denotes heat-insulating and sound-absorbing material mounted on the boss 3.

In the thus constructed exhaust system, since the end portion of the exhaust diffuser 2 and the outlet thereof are thus constructed, it is easy to cause the exhaust gas, discharged from the exhaust diffuser 2 to the exhaust chamber 1, to flow around and into the exhaust eductor 4, thereby considerably enhancing the value of the static pressure restoring coefficient Cp of the diffuser.

Accordingly, in the embodiment, even if the space where the exhaust chamber for a marine gas turbine is installed is limited, it is possible to maintain the efficiency of the exhaust diffuser at a good level.

In the exhaust system for a marine gas turbine according to the present invention, it is possible to make the system compact, and the system may remarkably contribute to the enhancement of the performance of the gas turbine.

The invention may be changed without departing from its spirit and scope. Furthermore, the foregoing description of the embodiments according to the present invention is provided for the purpose of illustration only, and not for the purpose of limiting the invention as defined by the appended claims and equivalents.

What we claim is:

1. An exhaust system for a marine gas turbine, comprising:
   an exhaust diffuser having an end portion, said end portion having an end and an outlet at said end, and said outlet having an upper portion and a lower portion;
   an exhaust chamber having an inlet, said exhaust diffuser being disposed such that said end portion of said exhaust diffuser is located in the vicinity of said inlet of said exhaust chamber; and
   an upper exhaust eductor, said exhaust chamber being connected with said upper exhaust eductor;
      wherein said outlet of said end of said exhaust diffuser is slanted such that said upper portion of said outlet is located upstream of said lower portion.

2. The exhaust system of claim 1, wherein said exhaust diffuser is horizontal.

3. An exhaust system for a marine gas turbine, comprising:
   an exhaust diffuser having an end portion, said end portion having an end and an outlet at said end, and said outlet having an uppermost portion and a lowermost portion;
   an exhaust chamber having an inlet, said exhaust diffuser being disposed such that said end portion of said exhaust diffuser is located in the vicinity of said inlet of said exhaust chamber; and
   an upper exhaust eductor, said exhaust chamber being connected with said upper exhaust eductor;
      wherein said outlet of said end of said exhaust diffuser is slanted as a whole such that said upper portion of said outlet is located upstream of said lower portion and said outlet, as a whole, is directed in an upward direction.

4. The exhaust system of claim 3, wherein a boss extends from said exhaust chamber upstream into said outlet, said upper portion being on an upper side of said boss, and said lower portion being on a lower side of said boss.

5. The exhaust system of claim 3, wherein said end portion of said exhaust diffuser increases in cross sectional area as said exhaust diffuser approaches said inlet of said exhaust chamber.

6. An exhaust system for a marine gas turbine, comprising:
   an exhaust diffuser having a stream direction and a downstream end portion, said downstream end portion having an end forming a stream outlet thereat, and said outlet having an uppermost portion and a lowermost portion;
   an exhaust chamber having a central portion and an inlet, said exhaust diffuser being disposed such that said end portion of said exhaust diffuser extends into said exhaust chamber with said outlet being located in the vicinity of said inlet of said exhaust chamber and before reaching said central portion of said exhaust chamber; and
   an upper exhaust eductor in fluid communication with said exhaust chamber;
      wherein said outlet of said end of said exhaust diffuser is slanted by having said end slanted upwardly as a whole so as to face in an upward direction as a whole, whereby said uppermost portion of said outlet is located upstream of said lowermost portion.

7. The exhaust system of claim 6, wherein said stream direction is horizontal.

8. The exhaust system of claim 6, wherein said end portion of said exhaust diffuser increases in cross sectional area as said exhaust diffuser approaches said inlet of said exhaust chamber.

9. The exhaust system of claim 1, wherein a boss extends centrally through said exhaust diffuser into said exhaust chamber, said upper portion being located above said boss, and said lower portion being located below said boss.

10. The exhaust system of claim 6, wherein a boss extends centrally through said exhaust diffuser into said exhaust chamber, said uppermost portion being located above said boss, and said lowermost portion being located below said boss.

* * * * *